United States Patent
Anders et al.

(10) Patent No.: US 12,544,850 B2
(45) Date of Patent: Feb. 10, 2026

(54) SYSTEMS AND METHODS FOR AUTOMATIC GOUGE TORCH ACTIVATION

(71) Applicant: Illinois Tool Works Inc., Glenview, IL (US)

(72) Inventors: Adam E. Anders, Oshkosh, WI (US); Caleb M. Rosera, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 215 days.

(21) Appl. No.: 16/942,447

(22) Filed: Jul. 29, 2020

(65) Prior Publication Data
US 2022/0032389 A1    Feb. 3, 2022

(51) Int. Cl.
| | |
|---|---|
| *B23K 9/12* | (2006.01) |
| *B23K 9/013* | (2006.01) |
| *B23K 9/10* | (2006.01) |
| B23K 9/095 | (2006.01) |

(52) U.S. Cl.
CPC .............. *B23K 9/124* (2013.01); *B23K 9/013* (2013.01); *B23K 9/1043* (2013.01); *B23K 9/0956* (2013.01)

(58) Field of Classification Search
CPC ...... B23K 9/124; B23K 9/013; B23K 9/1043; B23K 9/0956; B23K 9/02; B23K 9/0953; B23K 9/1006; B23K 9/1012
See application file for complete search history.

(56) References Cited

U.S. PATENT DOCUMENTS

| | | | | |
|---|---|---|---|---|
| 4,950,863 | A | * | 8/1990 | Gilliland ................ B23K 9/013 219/69.1 |
| 5,630,954 | A | * | 5/1997 | Toth ..................... B23K 9/0956 219/130.01 |
| 5,665,256 | A | * | 9/1997 | Toth ..................... B23K 9/0956 219/130.21 |

(Continued)

FOREIGN PATENT DOCUMENTS

| | | |
|---|---|---|
| AU | 2019226275 | 9/2019 |
| JP | 2804382 B2 * | 9/1998 |

(Continued)

OTHER PUBLICATIONS

European Office Communication with Extended Search Report Appln No. 21186157.0 dated Dec. 17, 2021.

*Primary Examiner* — Helena Kosanovic
*Assistant Examiner* — Thao Uyen Tran-Le
(74) *Attorney, Agent, or Firm* — McAndrews Held & Malloy, Ltd.

(57) ABSTRACT

Systems and methods are disclosed for automatically activating or deactivating a gouging torch. In particular, the disclosed systems and methods activate and/or deactivate a gouging torch based on a valve operation selection. For example, for welding power supplies and/or welding wire feeders configured to operate both wire welding processes as well as gouging, a valve can be integrated with a gouging torch, which can be adjusted to allow or arrest the flow of compressed air to the gouging torch. In response, the welding power source and/or welding wire feeder automatically changes one or more output characteristics, to switch between a wire welding process and a gouging process without requiring the operator to interact with either the welding power source or welding wire feeder.

20 Claims, 2 Drawing Sheets

(56) References Cited

U.S. PATENT DOCUMENTS

Figure 1:
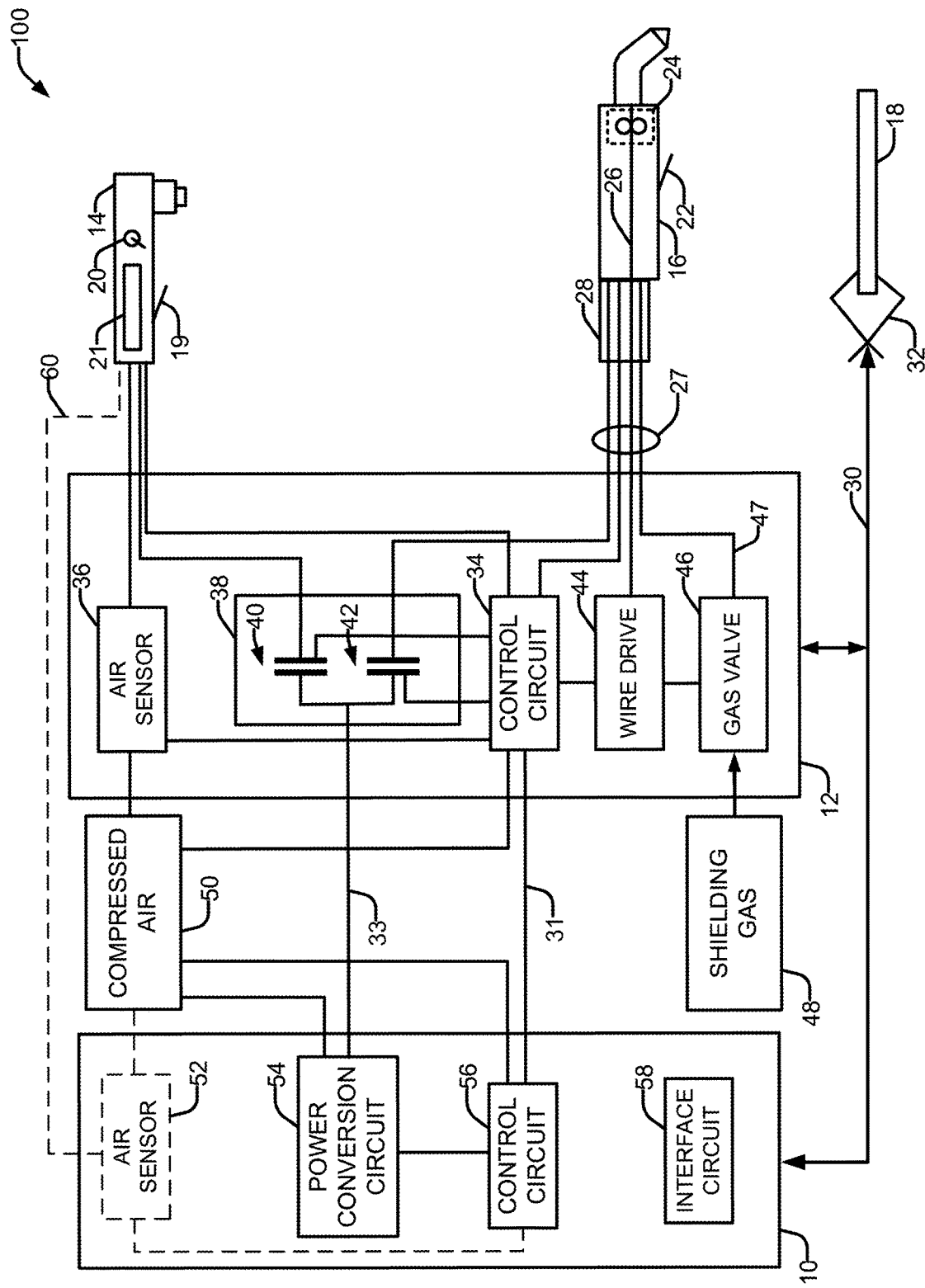

| | | | | | |
|---|---|---|---|---|---|
| 5,811,055 | A | * | 9/1998 | Geiger | B23K 9/325 266/49 |
| 5,852,278 | A | * | 12/1998 | Tanaka | B23K 9/1043 219/130.4 |
| 8,592,719 | B2 | * | 11/2013 | Albrecht | B23K 9/0956 219/136 |
| 9,457,433 | B2 | * | 10/2016 | Feldhausen | B23K 9/173 |
| 9,821,413 | B2 | | 11/2017 | Feldhausen | |
| 2006/0006160 | A1 | * | 1/2006 | Dean | B23K 9/324 219/137.41 |
| 2006/0163228 | A1 | * | 7/2006 | Daniel | B23K 9/0956 219/130.01 |
| 2007/0235432 | A1 | * | 10/2007 | Schneider | H05H 1/36 219/123 |
| 2008/0149602 | A1 | * | 6/2008 | Lenzner | B23K 9/1068 219/121.45 |
| 2008/0203065 | A1 | | 8/2008 | Feldhausen | |
| 2008/0203067 | A1 | * | 8/2008 | Feldhausen | B23K 9/16 219/68 |
| 2011/0284500 | A1 | * | 11/2011 | Rappl | F17D 5/06 219/74 |
| 2013/0112660 | A1 | * | 5/2013 | Enyedy | B23K 10/006 219/74 |
| 2013/0264317 | A1 | * | 10/2013 | Hoffa | H05H 1/34 219/121.53 |
| 2016/0023295 | A1 | * | 1/2016 | Lambert | H05H 1/42 219/121.44 |
| 2016/0175977 | A1 | * | 6/2016 | Denis | B23K 9/325 219/137 R |
| 2017/0021444 | A1 | * | 1/2017 | Simioni | B23K 9/322 |
| 2017/0036289 | A1 | * | 2/2017 | Enyedy | B23K 9/1006 |
| 2018/0036824 | A1 | * | 2/2018 | Peters | B23K 9/1062 |
| 2018/0206322 | A1 | * | 7/2018 | Wu | H05H 1/34 |
| 2019/0145412 | A1 | * | 5/2019 | Jochman | F02B 63/06 417/15 |
| 2019/0160582 | A1 | | 5/2019 | Imamachi | |
| 2019/0168333 | A1 | * | 6/2019 | Denis | B23K 9/0956 |

FOREIGN PATENT DOCUMENTS

| | | | |
|---|---|---|---|
| JP | 2001105132 | | 4/2001 |
| JP | 2001105132 A | * | 4/2001 |
| JP | 2011062724 | | 3/2011 |
| KR | 20180131928 | | 12/2018 |
| WO | 2008106419 | | 9/2008 |

* cited by examiner

SYSTEMS AND METHODS FOR AUTOMATIC GOUGE TORCH ACTIVATION

BACKGROUND

Welding is a process that has increasingly become ubiquitous in all industries. Conventional systems and methods for short circuit welding processes, such as welding, brazing, adhesive bonding, and/or other joining operations, require substantial investments in equipment, such as processing, displays, practice workpieces, welding tool(s), sensor(s), and/or other equipment.

Conventional welding systems may be capable of operating in a single mode, such as an arc welding mode or a gouging mode. Thus, operators who wish to perform both wire welding and gouging at a given jobsite require two separate power sources, and may have to leave the jobsite to change settings of the welding power supply and/or the welding wire feeder in order to switch between modes.

In this regard, the operator may benefit from systems and methods that provide systems or methods to switch between modes without leaving the jobsite.

SUMMARY

The present disclosure is directed to systems and methods for automatically activating or deactivating a gouging torch, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

DRAWINGS

FIG. 1 illustrates a welding-type system to automatically activate or deactivate a gouging torch, in accordance with aspects of this disclosure.

Figure 2:
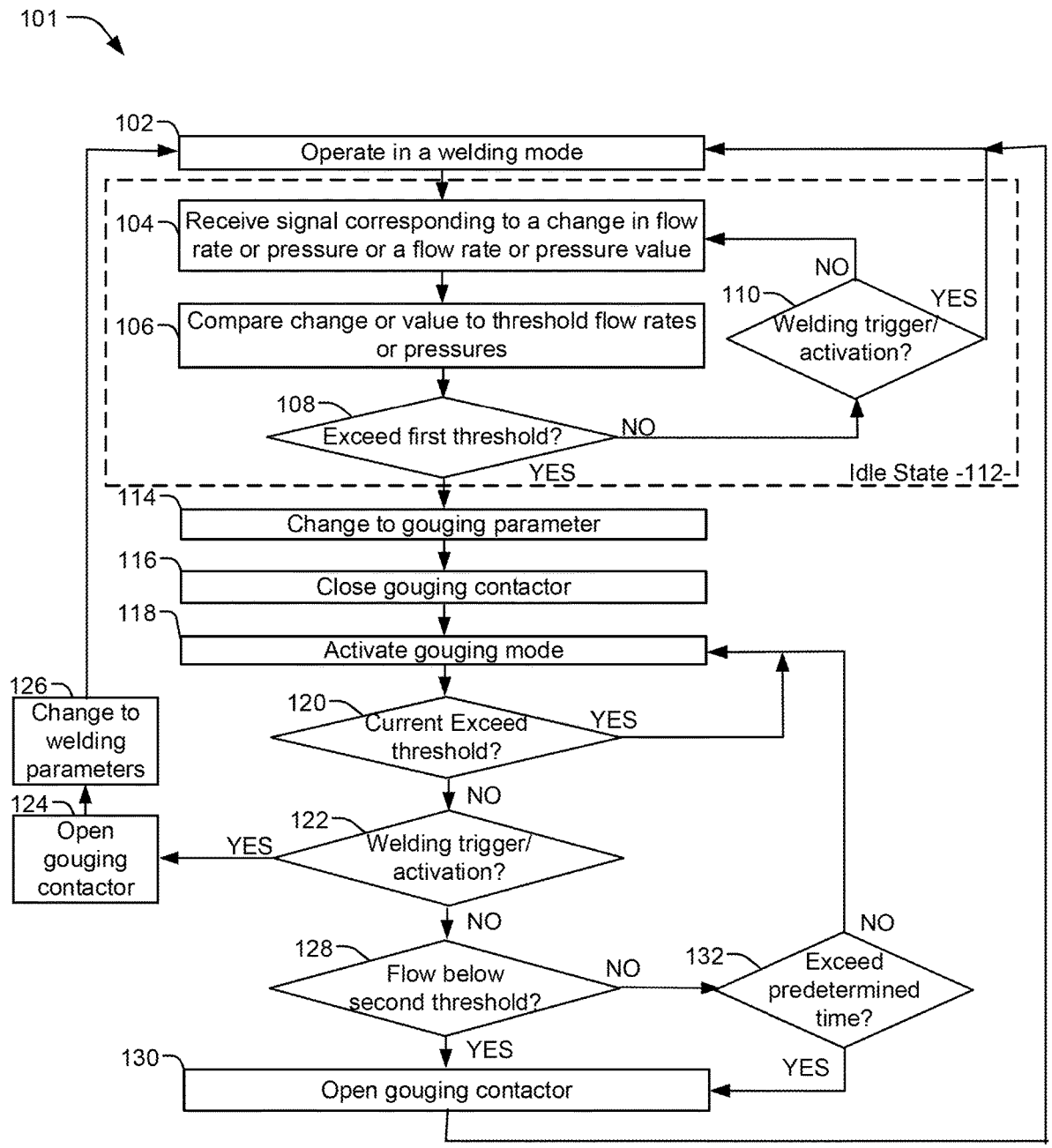

FIG. 2 provides a flowchart representative of example machine-readable instructions which may be executed by the example system of FIG. 1 to automatically activate or deactivate a gouging torch, in accordance with aspects of this disclosure.

The figures are not necessarily to scale. Where appropriate, similar or identical reference numbers are used to refer to similar or identical components.

DETAILED DESCRIPTION

The present disclosure is directed to systems and methods for automatically activating or deactivating a gouging torch. In particular, the disclosed systems and methods activate and/or deactivate a gouging torch based on a valve operation selection. For example, for welding power supplies and/or welding wire feeders configured to operate both wire welding processes (e.g., gas metal arc welding (GMAW), flux-cored arc welding (FCAW), shielded metal arc welding (SMAW)) as well as gouging (e.g., Carbon Arc Cutting-Air (CAC-A)), a valve can be integrated with a gouging torch, which can be adjusted to allow or arrest the flow of compressed air to the gouging torch. In response, the welding power source and/or welding wire feeder automatically changes one or more output characteristics (e.g., wire feed speed, power source settings, etc.), to switch between a wire welding process and a gouging process without requiring the operator to interact with either the welding power source or welding wire feeder.

Thus, the disclosed systems and methods employ a selector, which may be connected to a valve on the torch, to make a process selection, which causes the welding power supply and/or the welding wire feeder to adjust one or more output characteristics in response. The system may include separate cabling to each of the wire welding torch and the gouging torch (e.g., from the welding power supply and/or the welding wire feeder), as well as a separate compressed air line to the gouging torch.

Conventionally, operators who wish to perform both wire welding and gouging at a given jobsite have limited options. For example, two separate power sources can be used, one for each process. The operator may walk to the welding power supply and/or the welding wire feeder in order to change settings. In some examples, the operator may use a Y-cord on the welding circuit to connect both the wire feeder and gouge torch. However, given that each process requires specific outputs, one or both of the processes experience degraded performance when operating on the settings of the other (e.g., employing a constant voltage (CV) process for gouging translates into lower performance in comparison to a dedicated constant current (CC) process)).

In disclosed systems and methods, a sensor (e.g., an air flow and/or pressure sensor) monitors air to a gouging torch. Changes associated with the air to the gouging torch (e.g., a change in air flow rate or pressure, and/or a value of the air flow rate and/or the pressure with respect to one or more thresholds) can indicate whether the valve has been moved to select a gouging process or a wire welding process. In response, the control circuitry (in the welding power supply, the wire feeder, or both) can adjust one or more output parameters (e.g., power, voltage, current, wire feed speed, polarity, etc.) to provide output suitable for the selected process.

Advantageously, the discloses systems and methods allows the operator to remain in position at a joint to perform both welding and gouging operations without the need to disconnect cables or torches, and/or walk to the wire feeder and/or the welding power supply to transition between operations. Further, the use of valves, sensors, contactors, and/or software solutions ensures that the gouging torch is de-energized when not in use.

In disclosed examples, a welding system includes a power supply to operate in an arc welding mode or a gouging mode: a compressed air flow detection sensor configured to measure a flow rate or a pressure of compressed air to a torch; and a control circuitry configured to: receive signals from the compressed air flow detection sensor corresponding to the flow rate; control the power supply to operate in a gouging mode when the flow rate or the pressure has exceeded a first threshold flow rate or pressure; and control the power supply to operate in an arc welding mode when the flow rate or the pressure has gone below a second threshold flow rate or pressure.

In some examples, the torch comprises a selector to indicate an operating mode between the arc welding mode or the gouging mode. In examples, the selector is a valve to control flow of compressed air to the torch. In some examples, an interlock circuit configured to: close a gouging circuit and open an arc welding circuit in the gouging mode; and close the arc welding circuit and open the gouging circuit in the arc welding mode.

In examples, the interlock is a contactor, the control circuitry further configured to activate the contactor to open the gouging circuit in response to the welding torch trigger pull. In some examples, a wire feeder attached to the power source and cables from wire feeder to each torch, wherein compressed air is routed through the wire feeder and to the torch.

In examples, the compressed air flow detection sensor is located in the wire feeder and configured to transmit signals corresponding to the flow rate or the pressure to the control circuitry. In some examples, the compressed air flow detection sensor is located in the power supply and configured to transmit signals corresponding to the flow rate or the pressure to the control circuitry.

In examples, a welding cable connecting the torch to the wire feeder, the welding cable to convey one or more of arc welding power, gouging power, compressed air, electrode wire, shielding gas, or control signals. In some examples, wherein the control circuitry is further configured to control the wire feeder to stop electrode wire from advancing from the wire feeder to the torch in the gouging mode.

In examples, the control circuitry is further configured to adjust one or more output characteristics according to a gouging profile in response to activation of the gouging mode. In some examples, the one or more output characteristics comprises one or more of polarity, a voltage, a current, a power, a wire feed speed, or a combination thereof. In examples, the control circuitry is further configured to adjust one or more output characteristics according to an arc welding profile in response to activation of the arc welding mode.

In some examples, a sensor to monitor air flow or pressure, the sensor to send a signal to the control circuitry in response to the air flow or pressure exceeding the first threshold flow rate or pressure or the second threshold flow rate or pressure.

In disclosed examples, a welding system, comprising: a torch configured to operate in a gouging operating mode, the torch comprising a selector to indicate an operating mode; and a power supply to operate in an arc welding mode or a gouging mode, the power supply comprising a control circuitry configured to: receive signals from the selector corresponding to the selected operating mode; control the power supply to output gouging power in the gouging operating mode; and control the power supply to output arc welding power in the arc welding operating mode.

In some examples, the torch further comprises a valve, wherein the electrical switch is configured to control the valve to open in the gouging mode and to close in the welding mode. In some examples, the control circuitry is configured to: identify operation of the welding system in one of the arc welding operating mode or the gouging operating mode based on the signals from the selector; access a list of operating characteristics that associates the operating characteristics with the arc welding mode or the gouging mode; identify one or more operating characteristics corresponding to the identified mode; and adjust one or more of the operating characteristics in response to the identified one or more operating characteristics.

In some examples, the control circuitry is configured to control the power supply to: increase the power output in the gouging mode; and decrease the power output in the arc welding mode. In some examples, the selector is an electrical switch arranged on the torch and configured to indicate the operating mode.

In some examples, the control circuitry is configured to: activate a timer at initiation of the gouging mode; and deactivate the gouging mode if the gouging torch is not activated within a predetermined time period.

The term "welding-type system," as used herein, includes any device capable of supplying power suitable for welding, plasma cutting, induction heating, Carbon Arc Cutting-Air (e.g., CAC-A, or gouging), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding).

As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith. The term can include engine driven power supplies, energy storage devices, and/or circuitry and/or connections to draw power from a variety of external power sources.

As used herein, the term "wire feeder" includes the motor or mechanism that drives the wire, the mounting for the wire, and controls related thereto, and associated hardware and software.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to implement a welding process.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), Field Programmable Gate Arrays (FPGAs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "energy storage device" is any device that stores energy, such as, for example, a battery, a supercapacitor, etc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, plasma cutting, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the terms "first" and "second" may be used to enumerate different components or elements of the same type, and do not necessarily imply any particular order.

FIG. 1 illustrates an example welding system 100 for automatically activating a gouging torch. As shown in the welding system of FIG. 1, a power supply 10 and a wire feeder 12 are coupled via one or more conductors or conduits to share power, data, and/or other consumables. In the illustrated example, the power supply 10 may be separate from the wire feeder 12, such that the wire feeder may be positioned at some distance from the power supply near a welding location. However, in some examples the wire feeder may be integrated with the power supply 10. In examples in which the wire feeder 12 is separate from the power supply 10, terminals are typically provided on the power supply and on the wire feeder 12 to allow the conductors or conduits to be coupled to the systems so as to allow for power and/or gas to be provided to the wire feeder 12 and/or a tool from the power supply 10, and to allow data to be exchanged between the two devices (e.g., between control circuitry 34, 56). In some examples, a cable 33 can provide power from the power supply 10 to the wire feeder 12, and a cable 31 can provide data to or from the wire feeder 12. In some examples, a single cable can be used to provide both power and data between the power supply 10 and the wire feeder 12.

The system 100 is configured to provide wire, power and shielding gas to one or more welding tools, such as gouging torch 14 and/or welding torch 16. The welding torch 16 may be one of many different types, and may allow for the feed of a welding wire 26 (e.g., an electrode wire) from a wire drive 44 and/or gas from a shielding gas source 48 via a gas valve 46 and tube 47 to the welding torch 16. The welding torch 16 can then travel to a location adjacent to a workpiece 18 to perform a welding operation. The welding torch 16 may be activated by a trigger 22, which can send signals to the control circuitry 34 to activate wire drive 44 and/or supplemental wire feeder 24. A second conductor 30 is run to the welding workpiece 18 so as to complete an electrical circuit between the power supply 10 and/or the wire feeder 12 and the workpiece 18, such as via a clamp 32.

The gouging torch 14 includes a selector 20 (e.g., a mechanical and/or electronic switch) to control flow of air, such as from a compressed air source 50. Although illustrated as located on torch 14, the selector 20 (and/or valve 21) may be located on the wire feeder 12, the power supply 10, and/or along the length of the tubing that provides air flow to the torch 14. The compressed air source 50 (e.g., an air compressor) may be connected to one or more of the control circuitry 34, 56, and may draw power from the power conversion circuit 54 and/or an alternative power source (e.g., an energy storage device, mains power, etc.).

The control circuit 56 is coupled to power conversion circuit 54. This power conversion circuit 54 is adapted to create the output power, such as pulsed waveforms applied to the welding wire 26 at the tool 16. Various power conversion circuits may be employed, including choppers, boost circuit, buck circuit, inverters, converters, and so forth. The power conversion circuit 54 is coupled to a source of electrical power, such that the power applied to the power conversion circuit 54 may originate in the power grid, although other sources of power may also be used, such as power generated by an engine-driven generator, batteries, fuel cells or other alternative sources. The power supply illustrated in FIG. 1 may also include an interface circuit 58 configured to allow the control circuit 56 to exchange signals with the wire feeder 12, the torches 14, 16, and/or a remote control device (e.g., via wired connection and/or wirelessly).

In order to activate a gouging operation, the operator employs selector 20 to indicate a gouging mode, such that air flow from the compressed air source 50 to the torch 14 (e.g., via air sensor 36), drawing power from power conversion circuitry 38 (and/or power conversion circuitry 54). In disclosed examples, as the selector 20 is employed to indicate a gouging mode, the selector 20 opens a valve 21 to allow air to flow from the compressed air source 50 to the torch 14. Air sensor 36 measures the air flow (e.g., a change in the air flow or pressure, and/or an absolute air flow or pressure value), and the information is transmitted to the control circuitry 34 (and/or control circuitry 56), which determines activation of a gouging mode based on the selection. In some additional or alternative examples, the selector 20 includes one or more circuits, such as a sensor and/or transceiver, configured to transmit a signal to the control circuitry directly. Although illustrated as located within the wire feeder 12, additional or alternative air sensors may be located in the torch 14 body and/or along a length of the tube bringing air to the torch 14.

Upon determining the selection of a gouging mode, the control circuitry 34 controls a switch 40 (e.g., a contactor, a switch, a high amperage relay, solid-state device, an interlock, etc.) to close a circuit to provide power from power conversion circuitry 38 to the torch 14. Additionally, the control circuitry 34 controls switch 42 to open a circuit to prevent power from flowing to the welding torch 16. In examples, if a gouging process has been initiated, but the torch 14 has not been activated (e.g., the selector 20 has not been activated, etc.) within a given period of time, the control circuitry 38 may automatically terminate the gouging mode. This may include opening the switch 40, closing one or more valves of compressed air, and/or activating a welding mode. In some additional or alternative examples, the gouging torch 14 includes a trigger 19, which can be employed to activate the torch 14.

In some examples, the selector 20 can be employed to close the valve 21 and/or otherwise indicate the gouging operation has concluded. Signals are transmitted to the control circuit 34 (e.g., from the air sensor 36 and/or valve 21) that the gouging operation has ended, which then controls switch 40 to open the circuit to the torch 14, thereby preventing power from flowing to the torch 14. In some examples, the control circuitry 34 may automatically command switch 42 to close, thereby providing power to the welding torch 16 in preparation for a welding operation. In some examples, application of the trigger 22 of welding torch 16 indicates to the control circuitry 34 that a welding operation is selected, and closes the switch 42 (and/or opens the switch 40) to implement a welding operation. Pulling trigger 22 may also cause a valve controlling flow of the compressed air to close (e.g., valve 21, and/or a valve on compressed air source 50).

In some examples, when a measured and/or detected flow rate exceeds a first threshold, the control circuitry transitions the system to a gouge mode configuration. When a flow rate falls below a second, lower threshold, the control circuitry controls the system to exit the gouge mode. Upon exit of the gouge mode, the system can return to a welding mode or, in some examples, turn off or enter an idle mode.

In some examples, activating the torch 16 (e.g., a MIG torch, such as by a pull of trigger 22) can cause the system to exit the gouge mode. In additional or alternative examples, a timer can determine if a predetermined amount of time has passed without gouge current being detected.

In some examples, the system can maintain a default state when the gouge and/or welding modes have not been selected and/or are not active. For instance, the control circuitry may determine there is not air flow (e.g., gouge mode has not been selected/activated), and/or the trigger 22 has not been pressed (or other action, such as a selection of welding mode) to indicate welding mode has been activated.

In an example idle state, both contactors 40 and 42 would be open. Although in an idle state, the system configuration may remain in the previously employed mode (e.g., gouge or welding modes). Thus, an operator could turn off the air flow (e.g., via selector 20 and/or valve 21) when a gouge rod has been exhausted, thereby de-energizing the gouge torch and allowing the operator to change the rod without the electrode being live. Once the rod has been replaced, the operator could then turn the air back on, triggering the system to enter a gouging mode, which would close contactor 40 and provide power to torch 14 to continue a gouging process.

In some examples, de-selection of a gouging mode (or closing valve 21) would not cause the system to transition to a welding mode. For instance, transitioning to a welding mode may result in a number of output parameters to change (such as changing polarity on the power source), even as the operator may desire a return to the gouging mode, thus avoiding delays due to changing settings unnecessarily. Thus, even in the absence of airflow, the system may not return to a welding mode unless or until the trigger 22 is activated. In some examples, the system may be configured to transition between operating modes in response to a timeout (e.g., transitioning to idle mode after a given period of time).

In examples, the power supply 10 delivers a power output to one or more of the torch 14 or the torch 16 without employing any switch or contactor. In such an example, power regulation is governed by the control circuitry 34, 56 and/or the power conversion circuitry 38, 54. In some examples, a single cable 27 (e.g., a multi-functional cable) is connected to the power supply 10 or the wire feeder 12. The cable 27 may include a coupler 28 configured to removably connect to each torch 14, 16. In such an example, the selector 20 may be located on the coupler, along the cable (e.g., a remote control), the torch, the wire feeder, and/or the power supply.

Additionally or alternatively, the control circuitry 34 and/or control circuitry 56 adjusts one or more operational characteristics to implement the selected gouging mode or one or more welding modes. For example, process instructions for the arc welding and/or gouging operation can be provided as a weld sequence program, such as stored on a memory accessible to a processor/control circuitry 56 associated with the power supply 10 (and/or control circuitry 34). In such a case, the sequencer can employ stored information (e.g., associated with a desired operating mode, including historical data), and/or customizable information input by an operator (e.g., via an interface).

For example, a memory device may store processor executable instructions (e.g., firmware or software) for the control circuitry 34 or control circuitry 56 to execute. In addition, one or more control regimes for various welding processes (e.g., metal inert gas (MIG) or a gas tungsten arc welding (GTAW) welding process, plasma cutting, etc.), along with associated settings and parameters, may be stored in the memory device, along with code configured to provide a specific output (e.g., output power, power characteristics, change in polarity, initiate wire feed or set wire feeder speed, enable gas flow, wire feeder direction, travel speed, process mode, deposition path, deposition sequence, torch angle, etc.) during operation. One or more lists or look up tables may be provided, and/or network connections to various databases available to inform decision-making, such as to access preferred output parameters, to store updated parameter settings, etc.

For example, implementing a gouging process may include a change in polarity at the power supply 10 (e.g., via conversion circuitry 54). Thus, the information associated with activation of a gouging mode can be used to control operation of the system to change the polarity and facilitate proper adjustment of the operating characteristics in response to a selected operational mode, such as by controlling a power output from the power supply 10, wire feeder motors in wire drive 44, etc. In this manner, the system and/or the control circuit 22 controls the operational mode by adjusting one or more operational characteristics of the system to correspond to a gouging mode or one or more welding modes.

In an additional or alternative example, compressed air may be routed from the compressed air source 50 through the power supply 50. The power supply 10 may include an air sensor 52, where the flow rate and/or pressure would be detected. The compressed air can then be conveyed to the torch 14 via alternative tubing 60. Signals from the air sensor 52 could activate and/or deactivate the gouging mode, in a manner similar to air sensor 36.

The system 100 is configured for data settings to be selected by the operator and/or a welding sequence, such as via an operator interface 58 provided on the power supply 10. The operator interface 58 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the welding torch 16. These weld settings are communicated to a control circuit 56 within the power supply. The control circuit 56 may be in communication with various components of the welding power supply 10, as well as a control circuit 34 located in the wire feeder 12. In some examples, the wire feeder 12 incorporates an interface circuit, to receive inputs from a user and/or remote system.

FIG. 2 shows a flowchart representative of example machine readable instructions 101 which may be executed by the control circuitry 34 or 56 of FIG. 1 for automatically activating or deactivating a gouging torch. At block 102, the system is operating in a welding mode (such as via a selector (e.g., selector 20). At block 104, a signal corresponding to a change in flow rate or pressure (or an absolute value of flow rate or pressure) is received (e.g., from air sensor 36, air sensor 52, and/or the selector 20).

At block 106, the change or value of the flow rate or pressure is compared to one or more threshold flow rates or pressures (e.g., stored in memory of control circuitry 34, 56). If the change or value does not exceed the first threshold flow rate or pressure at block 108, the method proceeds to block 110 to monitor for a welding trigger (or other selection of a welding mode). If the welding trigger has activated the welding mode, the method proceeds to block 102 to operate in the welding mode. If the welding trigger has not activated the welding mode, the method proceeds to block 104 to continue to monitor for a signal corresponding to a flow rate or pressure.

In some examples, the process identified in blocks 102 to 110 corresponds to an idle state as disclosed herein, as represented in block 112. For instance, the system can maintain a default state when the gouge and/or welding modes have not been selected and/or are not active. In an example idle state, both contactors 40 and 42 would be open.

If the change or value exceeds the first threshold flow rate or pressure at block 108, the control circuitry controls the power supply to operate in a gouging mode at block 114, such as by changing one or more operating parameters according to effect a gouging process. At block 116, the control circuitry closes the gouging contactor (e.g., contactor 40) to close the gouging circuit. At block 118, the gouging mode is active, and the control circuitry monitors one or more output parameters. For instance, at block 120, if output current exceeds a given threshold (e.g., corresponding to a gouging process), the method continues to operate in gouging mode and monitors the output parameters in a loop.

If the output current does not exceed the given current threshold, the method proceeds to block 122 to determine whether a welding trigger has been pulled (and/or other activation technique). If welding has been activated, the method continues to block 124 to open the gouging contactor. At block 126, the control circuitry changes operating parameters to effect a welding operation in block 102.

If a welding has not been activated, the method proceeds to block 128, where the flow rate or pressure is compared against one or more thresholds. If a flow rate falls below a second threshold (e.g., lower than the first threshold), the control circuit exits the gouge mode, including opening the gouging contactor and gouging circuit in bock 130. Upon exit of the gouge mode, the method returns to a welding mode in block 102. In some examples, the control circuitry may turn off the system and/or enter an idle state, as disclosed herein.

If the flow rate does not fall below the second threshold, the method proceeds to block 132 to activate a timer. If a predetermined amount of time has passed without gouge current being detected, the method continues to block 130 to deactivate the gouging mode. If the predetermined amount of time has not passed before gouging current is detected, the method returns to block 118 to operate in the gouging mode.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system comprising:
   a power supply to operate in an arc welding mode or a gouging mode;
   a compressed air flow detection sensor configured to measure a pressure of compressed air to a torch;
   a selector to control the compressed air flow to the torch; and
   a control circuitry configured to:
      receive one or more first signals from the compressed air flow detection sensor corresponding to the pressure;
      monitor a measured pressure based on the one or more first signals;
      in response to determining that the measured pressure has exceeded a first threshold pressure, control the power supply to operate in the gouging mode;
      in response to determining that the measured pressure has gone below a second threshold pressure, control the power supply to operate in the arc welding mode; and
      control the power supply to operate in an idle state in response to turning off the compressed air flow to the torch, the idle state configured to maintain the arc welding mode or the gouging mode while preventing power flowing to the torch.

2. The welding system as defined in claim 1, wherein the selector indicates whether an operating mode is the arc welding mode or the gouging mode.

3. The welding system as defined in claim 1, wherein the selector is a valve.

4. The welding system as defined in claim 1, further comprising an interlock circuit configured to:
close a gouging circuit and open an arc welding circuit in the gouging mode; and
close the arc welding circuit and open the gouging circuit in the arc welding mode.

5. The welding system as defined in claim 4, wherein the interlock circuit is a contactor, the control circuitry further configured to activate the contactor to open the gouging circuit in response to a welding torch trigger pull of the torch.

6. The welding system as defined in claim 1, further comprising a wire feeder attached to the power supply and cables from the wire feeder to the torch, wherein compressed air is routed through the wire feeder and to the torch.

7. The welding system as defined in claim 6, wherein the compressed air flow detection sensor is located in the wire feeder and configured to transmit signals corresponding to the pressure to the control circuitry.

8. The welding system as defined in claim 6, wherein the compressed air flow detection sensor is located in the power supply and configured to transmit signals corresponding to the pressure to the control circuitry.

9. The welding system as defined in claim 6, further comprising a welding cable connecting the torch to the wire feeder, the welding cable to convey one or more of arc welding power, gouging power, compressed air, electrode wire, shielding gas, or control signals.

10. The welding system as defined in claim 6, wherein the control circuitry is further configured to control the wire feeder to stop electrode wire from advancing from the wire feeder to the torch in the gouging mode.

11. The welding system as defined in claim 6, wherein the compressed air flow detection sensor to send a signal to the control circuitry in response to the pressure exceeding the first threshold pressure or going below the second threshold pressure.

12. The welding system as defined in claim 11, wherein the control circuitry is configured to:
activate a timer at initiation of the gouging operating mode; and
deactivate the gouging operating mode if the torch is not activated within a predetermined time period.

13. The welding system as defined in claim 1, wherein the control circuitry is further configured to adjust one or more output characteristics according to a gouging profile in response to activation of the gouging mode.

14. The welding system as defined in claim 13, wherein the one or more output characteristics comprises one or more of polarity, a voltage, a current, the power, a wire feed speed, or a combination thereof.

15. The welding system as defined in claim 1, wherein the control circuitry is further configured to adjust one or more output characteristics according to an arc welding profile in response to activation of the arc welding mode.

16. The welding system as defined in claim 1, wherein the selector comprises a valve, wherein the selector is configured to control the valve to open in the gouging mode and to close in the welding mode.

17. The welding system as defined in claim 1, wherein:
the compressed air flow detection sensor is further configured to measure a flow rate of compressed air to the torch; and
the control circuitry is further configured to:
receive one or more second signals from the compressed air flow detection sensor corresponding to the flow rate;
monitor a measured flow rate based on the one or more second signals;
in response to determining that the measured flow rate has exceeded a first threshold flow rate, control the power supply to operate in the gouging mode;
in response to determining that the measured flow rate has gone below a second threshold flow rate, control the power supply to operate in the arc welding mode.

18. A welding system comprising:
a power supply to operate in an arc welding mode or a gouging mode;
a compressed air flow detection sensor configured to measure a flow rate of compressed air to a torch;
a selector to control the compressed air flow to the torch; and
a control circuitry configured to:
receive one or more signals from the compressed air flow detection sensor corresponding to the flow rate;
monitor a measured flow rate based on the one or more signals;
in response to determining that the measured flow rate has exceeded a first threshold flow rate, control the power supply to operate in the gouging mode;
in response to determining that the measured flow rate has gone below a second threshold flow rate, control the power supply to operate in the arc welding mode; and
in response to a signal from the selector comprising a switch to turn off the compressed air flow to the torch, control the power supply to turn off welding or gouging power to the torch.

19. The welding system as defined in claim 18, further comprising an interlock circuit configured to:
close a gouging circuit and open an arc welding circuit in the gouging mode; and
close the arc welding circuit and open the gouging circuit in the arc welding mode.

20. The welding system as defined in claim 18, further comprising a wire feeder attached to the power supply and cables from the wire feeder to the torch, wherein compressed air is routed through the wire feeder and to the torch.

* * * * *